United States Patent [19]

Schuppiser et al.

[11] Patent Number: 4,855,069
[45] Date of Patent: Aug. 8, 1989

[54] POLYSACCHARIDE-THICKENED AQUEOUS ACID CLEANING COMPOSITIONS

[75] Inventors: Jean-Luc Schuppiser, Claye Souilly; Marie-Madeleine Besnard, Antony, both of France

[73] Assignee: Rhone-Poulenc Chimie, Courbevoie, France

[21] Appl. No.: 228,233

[22] Filed: Aug. 4, 1988

Related U.S. Application Data

[63] Continuation of Ser. No. 9,898, Feb. 2, 1987, abandoned.

[30] Foreign Application Priority Data

Jan. 31, 1986 [FR] France ................................ 86 01338

[51] Int. Cl.$^4$ ................................................. C11D 7/60
[52] U.S. Cl. ........................................ 252/87; 106/208; 134/3; 134/41; 252/82; 252/100; 252/136; 252/142
[58] Field of Search ...................... 106/208; 134/3, 41; 252/82, 87, 100, 136, 142

[56] References Cited

U.S. PATENT DOCUMENTS

| | | | |
|---|---|---|---|
| 2,995,477 | 8/1961 | Florence | 252/142 |
| 3,003,899 | 10/1961 | Eberhard et al. | 252/142 |
| 3,211,659 | 10/1965 | Pikaar | 252/136 |
| 3,510,432 | 5/1970 | Squire | 134/41 |
| 3,578,499 | 5/1971 | Crotty et al. | 252/106 |
| 3,899,437 | 8/1975 | Regan et al. | 252/106 |
| 4,095,991 | 6/1978 | Falcoz et al. | 106/208 |
| 4,302,253 | 11/1981 | Ciullo | 252/102 |
| 4,333,785 | 6/1982 | Erickson | 134/3 |
| 4,595,517 | 6/1986 | Abadi | 252/82 |

*Primary Examiner*—Robert A. Wax
*Attorney, Agent, or Firm*—Burns, Doane, Swecker & Mathis

[57] ABSTRACT

Aqueous acid cleaning compositions well adapted, e.g., for the descaling of metallic face surfaces include (i) water, (ii) a carboxylic acid dissolved therein having a dissociation constant pK, at 25° C., of at least 2, (iii) a stabilizing amount of at least one salt of an acid having a pK value of at least 2, and of a strong base, and (iv) a thickening amount of a polysaccharide.

12 Claims, No Drawings

POLYSACCHARIDE-THICKENED AQUEOUS ACID CLEANING COMPOSITIONS

This application is a continuation of application Ser. No. 009,898, filed Feb. 2, 1987, now abandoned.

BACKGROUND OF THE INVENTION

1. Field of the Invention

The present invention relates to novel aqueous acid cleaning compositions thickened by an effective amount of a polysaccharide, and to the use of such compositions for the cleaning of stained, soiled or fouled surfaces.

2. Description of the Prior Art

It is conventional in this art to use aqueous acid compositions to remove inorganic and organic deposits adhering to a variety of surfaces. These inorganic deposits typically include compounds such as carbonates, sulfates or oxides of metals, such as of calcium, magnesium, potassium and iron. Compositions based on hydrochloric acid or formic acid are customarily used to remove tartar from porcelain surfaces and compositions containing phosphoric acid are well known for the elimination of rust from metal surfaces. Advantageously, liquid cleaning compositions are thickened by means of a viscosifying agent such that the product may be applied to surfaces that are inclined or irregular in shape without excessive running, in order to provide a sufficient contact time between the acid and the surface to be cleaned.

The use of a thickener displaying Newtonian behavior in aqueous solution is not satisfactory, as the solution always has a tendency to flow, even if the thickener is incorporated in relatively large amounts. Cleaning compositions of a non-Newtonian character comprising a thickener such as xanthan gum, have already been proposed to this art; see, for example U.S. Pat. No. 3,578,499 and published European application No. 0,091,194. Although xanthan gum is considered to be reasonably stable at low pH values, it nevertheless hydrolyzes in the presence of an acid, giving rise to a reduction in viscosity and of the flow threshold. These compositions, therefore, cannot be stored for extended periods of time without losing their rheological properties.

In U.S. Pat. No. 4,302,253 certain cleaning compositions are proposed which include a solution of a mineral acid thickened with a clay, xanthan gum and an imidazoline. The imidazoline serves as the anti-flocculating agent for the clay. These compositions are stable for several months, but they have the disadvantage of a relatively high cost.

In actual practice, serious need has long existed for low cost aqueous acid compositions having all of the viscosity desired, a high flow threshold and the necessary stability in storage.

SUMMARY OF THE INVENTION

Accordingly, a major object of the present invention is the provision of improved cleaning compositions thickened by means of a polysaccharide, said improved compositions being characterized in that they contain an organic acid in aqueous solution which has a negative log of the dissociation constant (pK) at 25° C. higher than or equal to 2 and at least one salt of an organic or inorganic acid having a pK higher than or equal to 2 and of a strong base.

DETAILED DESCRIPTION OF THE PREFERRED EMBODIMENTS OF THE INVENTION

More particularly according to the present invention, the polysaccharide serving as the thickener is advantageously selected from among the natural gums, modified natural gums and biosynthetic gums. The term "polysaccharide" is intended to cover all polysaccharides or derivatives thereof which swell upon dispersion in water to produce gels or highly viscous solutions. Exemplary of the natural or modified natural gums are guar gum, carob gum, carragheenates, alginates such as sodium alginate and propyleneglycol alginate, cellulose derivatives, such as the carboxymethylcelluloses, hydroxyalkylcelluloses, and hexamethylpropylcelluloses. Biosynthetic gums or biogums are polysaccharides or heteropolysaccharides of high molecular weight obtained by the fermentation of a carbohydrate under the action of an appropriate microorganism. These microorganisms include bacteria, such as those described in Bergey's, *Manual Of Determinative Bacteriology* (8th Edition, 1974 - Williams and Wilkins Co., Baltimore), for example, bacteria belonging to the genus Xanthomonas and more specifically the species *Xanthomonas begoniae, Xanthomonas campestris, Xanthomonas carotae, Xanthomonas hedera, Xanthomonas incanae, Xanthomonas malvacearum, Xanthomonas papaveri cola, Xanthomonas phaseolii, Xanthomonas pisi, Xanthomonas vasculorum, Xanthomonas vericatoria, Xanthomonas vitians, Xanthomonas pelargonii;* bacteria of the genus Arthrobacter and more particularly the species *Arthrobacter stabilis* and *Arthorobacter viscosus;* of the genus Erwinia; of the gums Azotobacter and more particularly the species *Azotobacter indicus;* of the genus Agrobacterium and more particularly the species *Agrobacterium radiobacter, Agrobacterium rhizogenes* and *Agrobacterium tumefaciens;* or the fungi belonging to the genus Sclerotium and more particularly the species *Sclerotium glucanicum, Sclerotium Rolfsii,* and the like.

All of the aforementioned gums display pseudoplastic behavior in aqueous solution.

The heteropolysaccharide designated xanthan gum is preferably selected; it is obtained by the fermentation of a carbohydrate by means of a culture of *Xanthomonas campestris.* Xanthan gum is readily available commercially. Its preparation is described in numerous patents and publications. Compare, for example, U.S. Pat. Nos. 3,020,206, 3,020,270, 3,391,060 and 4,154,654. The designation "xanthan gum" includes treated and modified materials, such as deacetylized xanthan gum, depyruvatized xanthan gum, xanthan gum cross-linked with polyvalent cations, the gum/glyoxal complexes, and the like. In the compositions of the invention, one gum or a mixture of gums may be used. It is known that within certain proportions, mixtures of gums possess a synergy in regard to viscosifying and/or gelling capability. Thus, synergism may be used to advantage in the compositions of the invention.

The acid component of the subject compositions may be any monocarboxylic acid or polycarboxylic acid, whether saturated or unsaturated, that is soluble in water and has a negative log of the dissociation constant (pK), measured at 25° C., equal to or greater than 2.

Representative examples of such acids are monocarboxylic acids such as formic acid, acetic acid, chloroacetic acid, lactic acid, ascorbic acid; dicarboxylic acids such as fumaric acid, malonic acid, succinic acid, glutaric acid, itaconic acid, tartaric acid; tricarboxylic acids such as citric acid, whether used singly or as admixtures thereof. In compositions for the cleaning of surfaces, formic acid, acetic acid and citric acid are particularly preferred. Preferably, the pK constant will not be greater than approximately 6–7.

Exemplary of the salt of an acid having a pK higher than 2 and of a strong base, the following are representative: alkali metal or ammonium salts of the aforenoted acids or mixtures thereof. Specific examples of such salts are sodium formate, potassium formate, monosodium, disodium or trisodium phosphates, monopotassium, dipotassium or tripotassium phosphates, sodium borate, sodium or potassium monohydrogenocitrate, sodium or potassium tartrates, sodium or potassium acid tartrates, sodium carbonate, sodium bicarbonate, sodium or potassium phthalates, sodium or potassium acid phthalates, and the like.

The relative proportions of the acid, the acid salt and the polysaccharide may vary greatly as a function of factors such as the nature of each of the additives, the viscosity desired and the specific application intended. Representative of typical compositions, without implying any limitation on the invention, are those having a pH of approximately 1.5 to 6, containing from 2 to 40% by weight acid, from 0.1 to 30% acid salt, from approximately 0.001 to approximately 20% of the polysaccharide and from 10 and 97% by weight water.

In these cleaning compositions according to the invention, the acid is typically present in amounts of from 0.5 mole to 10 moles per liter of the composition such as to provide effective cleaning action. The amount of the salt is a function of the value of the pK and the amount of free acid present in the composition. The amount required is determined such as to maintain the pH of the solution at a value of from approximately 1.5 to 6 and preferably from 2 to 4. The optimum pH depends upon the nature of the deposit to be removed and the nature of the surface to be cleaned.

The amount of the polysaccharide to be included in the composition may also vary over wide limits as a function of the thickening power of the gum selected and the desired consistency of the final product, which may vary from a liquid to a gel. It is important for the cleaning of the surfaces that the viscosity and/or the flow threshold be such that the composition may be applied at the thickness desired and maintained flowable on inclined surfaces. Compositions used for the removal of tartar from sanitary articles are generally packaged in spray bottles. Amounts of the polysaccharide of from 0.001 to 10%, preferably 0.01 to 5%, should be sufficient to enable easy flow from the nozzle, while being sufficiently viscous to remain in contact with the surface to be cleaned. Compositions in the form of a thick or pasty gel more specifically adapted for scale removal by being spread with a knife or a brush, or in the form of a solid gel which can be diluted with water, may contain, for example, from 0.1 to 20% by weight of the polysaccharide (with respect to the total weight of the composition).

The compositions may be prepared in any manner desired by mixing the various additives in water. It is desirable to initially disperse and dissolve the polysaccharide in water and then add the acid and finally the salt.

The addition of the acid salt has the effect of raising the flow threshold of the composition. Furthermore, it makes it possible to minimize the hydrolysis of the polysaccharide, which hydrolysis gives rise to a decline in viscosity and of the flow threshold. The compositions may thus be stored for long periods of time while retaining satisfactory rheological properties. They are especially useful for the removal of tartar from porcelain surfaces and for the descaling of metal surfaces.

The compositions may optionally contain various other ingredients typically used in acid formulations, such as surface active agents, colorants, detergents, perfumes, bactericides, abrasives, etc.

In order to further illustrate the present invention and the advantages thereof, the following specific examples are given, it being understood that same are intended only as illustrative and in nowise limitative. In said examples to follow, all parts are given by weight.

EXAMPLE 1

20 parts by weight of 100% pure formic acid were added to 80 parts by weight of an aqueous solution containing 3.75 g/liter of xanthan gum (trademark Rhodopol of Rhone-Poulenc Specialites Chimiques Co.). This composition is designated as Control (A).

In 95 parts of the control composition, 5 parts of trisodium phosphate·12 $H_2O$ were dissolved. The pH was equal to 2.

Aliquot fractions of each composition were stored for 30 days at 25° C. and 40° C.

The viscosity, the critical flow stress and the tartar removing power of each sample were measured.

The viscosity and critical flow stress were measured by means of a rotating Rheomat 30 ® viscosimeter at 25° C.

The viscosity was determined at 100 $sec^{-1}$.

Critical flow stress $\sigma_c$: viscosities were measured over a wide range of velocity gradients (0.01 to 700 $sec^{-1}$) changing over a cycle of increasing and decreasing velocities in 2 min. The critical flow stress is defined as the value of the residual stress obtained immediately following discontinuation of shearing.

The tartar removing power was evaluated by the following test: a 4 g plate of 100% calcium carbonate material, and having the dimensions of 20×20×5 mm, was immersed in the composition, the amount of which was calculated in a manner such that the reaction between the $CaCO_3$ and the acid was equimolar. After 15 min of contact, 30 g distilled water were added and the solution permitted to stand for two hours. The relative weight loss of the material (Δp%) was measured. The test was carried out on the compositions following storage for 30 days at 25° C. and 40° C.

The results are reported in the following Table I:

TABLE I

| | Age (days) | Storage at 25° C. | | | Storage at 40° C. | | |
|---|---|---|---|---|---|---|---|
| | | $\sigma_c$ (mPa) | η (mPa.s) | Δp % | $\sigma_c$ (mPa) | η (mPa.s) | Δp % |
| (A) | 0 | 285 | 46 | | 285 | 46 | |
| | 30 | 70 | 40 | 66 | 50 | 36 | 61 |
| Ex. 1 | 0 | 380 | 46 | | 380 | 46 | |
| | 30 | 200 | 46 | 57 | 150 | 43 | 49 |

It will be seen that the composition according to the invention had a flow threshold higher than the control composition at the same viscosity and that its stability in storage, as measured by the evolution of the critical flow stress and of the viscosity, was better.

EXAMPLE 2

A solution containing 0.3% of xanthan gum and 9.5% formic acid [Control (B)] was prepared, as described in Example 1.

To 98.1 parts of solution (B), 1.9 parts of trisodium phosphate·2 $H_2O$ were added, to provide a pH equal to 2.

The tests described in Example 1 were repeated; results are reported in the following Table II:

TABLE II

|  | Age (days) | Storage at 25° C. | | | Storage at 40° C. | | |
| --- | --- | --- | --- | --- | --- | --- | --- |
|  |  | $\sigma_c$ (mPa) | $\eta$ (mPa.s) | $\Delta p$ % | $\sigma_c$ (mPa) | $\eta$ (mPa.s) | $\Delta p$ % |
| (B) | 0 | 290 | 46 |  | 290 | 46 |  |
|  | 30 | 80 | 41 | 51 | 50 | 38 | 51 |
| Ex. 2 | 0 | 360 | 46 |  | 360 | 46 |  |
|  | 30 | 220 | 46 | 41 | 175 | 44 | 38 |

A comparison of the values of the compositions according to Example 1 and of the control composition (B) demonstrated that, for an essentially equal tartar removing power, the compositions of the invention had an initial flow stress of +31% and +150% after 30 days of storage.

EXAMPLE 3

Example 2 was repeated, but increasing the xanthan gum concentration. In this example, the aqueous control solution (C) contained 0.45% xanthan gum and 9.5% formic acid.

To 98.1 parts of solution (C), 1.9 parts of trisodium phosphate·2 $H_2O$ were added. The pH was equal to 2.

The test results are reported in the following Table III:

TABLE III

| Age | Storage at 25° C. | | | Storage at 40° C. | |
| --- | --- | --- | --- | --- | --- |
|  | $\sigma_c$ | $\eta$ | $\Delta p$ | $\sigma_c$ | $\eta$ |
|  | (days) | (mPa) | (mPa.s) | % | (mPa) | (mPa.s) |
| (C) | 0 | 930 | 81 |  | 930 | 81 |
|  | 30 | 360 | 67 | 45 | 285 | 65 |
| Ex. 3 | 0 | 1,215 | 82 |  | 1,215 | 82 |
|  | 30 | 600 | 71 | 34 | 430 | 72 |

EXAMPLES 4 TO 6

The following solutions were prepared:
(D): xanthan gum: 0.3 p
  acetic acid 100%: 30.0 p
  water: 69.7 p
(E): xanthan gum: 0.3 p
  citric acid 100%: 30.0 p
  water: 69.7 p
(F): xanthan gum: 0.3 p
  100% phosphoric acid: 8.7 p
  water: 91.0 p To 100 parts of solutions (D), (E) and (F), trisodium phosphate·10$H_2O$ was added in the following quantities:
(D): 0.7 p (Example 4); pH : 2.3
(E): 11.1 p (Example 5); pH : 2
(F): 11.85 p (Example 6); pH : 2

The test results are reported in the following Table IV:

TABLE IV

|  | Age (days) | Storage at 25° C. | | | Storage at 40° C. | |
| --- | --- | --- | --- | --- | --- | --- |
|  |  | $\sigma_c$ (mPa) | $\eta$ (mPa.s) | $\Delta p$ % | $\sigma_c$ (mPa) | $\eta$ (mPa.s) |
| (D) | 0 | 240 | 43 |  | 240 | 43 |
|  | 30 | 192 | 41 | 28 | 100 | 32 |
| Ex. 4 | 0 | 285 | 43 |  | 285 | 43 |
|  | 30 | 285 | 43 | 26 | 200 | 38 |
| (E) | 0 | 480 | 68 |  | 480 | 68 |
|  | 30 | 125 | 50 | 29 | 55 | 46.5 |
| Ex. 5 | 0 | 860 | 67 |  | 860 | 67 |
|  | 30 | 600 | 62 | 27 | 310 | 56 |
| (F) | 0 | 260 | 45 |  | 260 | 45 |
|  | 30 | 25 | 34 | 15.5 | 20 | 31.5 |
| Ex. 6 | 0 | 430 | 47 |  | 430 | 47 |
|  | 30 | 200 | 42.5 | 12 | 50 | 38.5 |

The performance obtained using the composition of Example 6 was lower than that of the other compositions, both in regard to cleaning and stability in storage, particularly at 40° C.

EXAMPLES 7 TO 9

In these examples, the nature and the quantity of salt added were varied.

The aqueous control solution (G) contained 0.3% xanthan gum and 9.5% formic acid.

The test results are reported in the following Table V:

TABLE V

|  | Salt added* | pH | Age days | Storage at 25° C. | | | Storage at 40° C. | |
| --- | --- | --- | --- | --- | --- | --- | --- | --- |
|  |  |  |  | $\sigma_c$ (mPa) | $\eta$ (mPa.s) | $\Delta p$ % | $\sigma_c$ (mPa) | $\eta$ (mPa.s) |
| (G) |  |  | 0 | 290 | 43 |  | 290 | 43 |
|  |  |  | 30 | 80 | 39 | 51 | 50 | 38 |
| Ex. 7 | H COONa 0.65 p. | 2 | 0 | 344 | 44 |  | 344 | 44 |
|  |  |  | 30 | 228 | 44 | 37 | 143 | 44 |
| Ex. 8 | H COONa 1.44 p. | 2.3 | 0 | 390 | 44 |  | 390 | 44 |
|  |  |  | 30 | 285 | 44 | 34 | 160 | 44 |
| Ex. 9 | H COONa 19 p. | 3.52 | 0 | 400 | 44 |  | 400 | 44 |
|  |  |  | 30 | 330 | 44 | 29 | 250 | 44 |

*per 100 p. of solution (G)

EXAMPLES 10 AND 11

Different polysaccharides were used:
Control (H): the aqueous solution contained 0.48% guar gum and 20% formic acid.

To 100 parts of this solution, 5.26 parts of trisodium phosphate (Example 10) were added.
The pH was equal to 2.

Control (I): the aqueous solution contained 0.48% carboxymethyl cellulose and 20% formic acid.

To 100 parts of this solution, 25 parts of trisodium phosphate (Example II) were added. The pH was equal to 4.

The test results are reported in the following Table VI:

TABLE VI

|  | Age (days) | Storage at 25° C. | | | Storage at 40° C. | |
|---|---|---|---|---|---|---|
|  |  | $\sigma_c$ (mPa) | $\eta$ (mPa.s) | $\Delta p$ % | $\sigma_c$ (mPa) | $\eta$ (mPa.s) |
| (H) | 0 | 710 | 180 | | | |
|  | 30 | 10 | 90 | 75 | | |
| Ex. 10 | 0 | 830 | 240 | | | |
|  | 30 | 200 | 200 | 49 | | |
| (I) | 0 | 100 | 90 | | 100 | 90 |
|  | 30 | 0 | 87 | 48 | 0 | 0 |
| Ex. 11 | 0 | 150 | 90 | | 150 | 90 |
|  | 30 | 80 | 90 | 32 | 50 | 60 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueous acid composition of matter, comprising (i) water, (ii) a carboxylic acid dissolved therein having a negative log of the dissociation constant (pK), at 25° C., of at least 2, (iii) a stabilizing amount of at least one salt of an acid having a pK value of at least 2, and of a strong base, and (iv) a thickening amount of a polysaccharide.

2. The aqueous acid composition as defined by claim 1, said polysaccharide comprising a natural gum, a modified natural gum, a biosynthetic gum, or admixture thereof.

3. The aqueous acid composition as defined by claim 1, said polysaccharide comprising a Xanthomonas heteropolysaccharide.

4. The aqueous acid composition as defined by claim 1, said polysaccharide comprising xanthan gum.

5. The aqueous acid composition as defined by claim 1, said carboxcylic acid comprising formic acid, acetic acid, or citric acid.

6. The aqueous acid composition as defined by claim 1, having a pH of from 1.5 to 6.

7. The aqueous acid composition as defined by claim 6, having a pH of from 2 to 4.

8. The aqueous acid composition as defined by claim 7, comprising from 0.001 to 20% by weight of said polysaccharide, relative to the total weight thereof.

9. The aqueous acid composition as defined by claim 8, comprising from 2 to 40% by weight of said carboxylic acid, from 0.1 to 30% by weight of said salt, and from 10 to 97% by weight of water.

10. The method of cleaning a stained, soiled or fouled face surface, comprising applying thereto an effective cleansing amount of the aqueous acid composition as defined by claim 1.

11. The method of removing tartar deposits from a porcelain face surface, comprising applying to such face surface an effective tartar-removing amount of the aqueous acid composition as defined in claim 1.

12. The method of descaling a metallic face surface, comprising applying to such face surface an effective scale-removing amount of the aqueous acid composition as defined by claim 1.

* * * * *